US011472089B2

(12) United States Patent
Pandey et al.

(10) Patent No.: US 11,472,089 B2
(45) Date of Patent: Oct. 18, 2022

(54) MIXING ELEMENT HAVING PROJECTIONS DEFINING CHANNELS OF VARYING WIDTH AND DEPTH FOR EXTRUSION OPERATIONS

(71) Applicant: CASE WESTERN RESERVE UNIVERSITY, Cleveland, OH (US)

(72) Inventors: Vivek Pandey, Cleveland, OH (US);
Sidney Carson, Cleveland, OH (US);
Joao Maia, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 610 days.

(21) Appl. No.: 16/404,339

(22) Filed: May 6, 2019

(65) Prior Publication Data

US 2019/0337214 A1 Nov. 7, 2019

Related U.S. Application Data

(60) Provisional application No. 62/667,124, filed on May 4, 2018.

(51) Int. Cl.
*B29C 48/62* (2019.01)
*B29C 48/68* (2019.01)
*B29C 48/67* (2019.01)
*B29C 48/565* (2019.01)

(52) U.S. Cl.
CPC ........... *B29C 48/62* (2019.02); *B29C 48/565* (2019.02); *B29C 48/67* (2019.02); *B29C 48/68* (2019.02)

(58) Field of Classification Search
CPC ....... B29C 48/62; B29C 48/68; B29C 48/405; B29C 48/67; B29C 48/402; B29C 48/565

USPC .................................................... 366/80–81
See application file for complete search history.

(56) References Cited

U.S. PATENT DOCUMENTS

| 3,671,141 | A | * | 6/1972 | Kovacs | B29C 48/565 366/319 |
| 3,751,015 | A | * | 8/1973 | Hensen | B29C 48/565 366/81 |
| 5,044,759 | A | * | 9/1991 | Gagliani | B29B 7/421 366/88 |
| 5,451,106 | A | | 9/1995 | Nguyen et al. | |
| 2007/0147169 | A1 | * | 6/2007 | Mattingly | B30B 11/246 366/82 |

(Continued)

FOREIGN PATENT DOCUMENTS

KR 100758479 B1 * 9/2007 ............. B29C 48/67

OTHER PUBLICATIONS

Oliveira, et al., "Viscous flow through microfabricated hyperbolic contractions", Exp Fluids (2007) 43:437-451.

(Continued)

*Primary Examiner* — Charles Cooley
(74) *Attorney, Agent, or Firm* — Tarolli, Sundheim, Covell & Tummino LLP

(57) ABSTRACT

A mixing element for an extruder screw having a width extending in an x-direction of an x-y-z coordinate system, a length extending in a y-direction, and a thickness extending in a z-direction. The mixing element includes a base defining a passage extending along an axis in the y-direction for receiving the extruder screw. Projections extend radially outward from the base and define channels therebetween. The width and the depth of each channel vary along the length of the channel.

9 Claims, 22 Drawing Sheets

(56) References Cited

U.S. PATENT DOCUMENTS

| | | | |
|---|---|---|---|
| 2007/0183253 A1* | 8/2007 | Siegenthaler | B29B 7/423 366/80 |
| 2009/0027994 A1* | 1/2009 | Grutter | B29C 48/397 366/79 |
| 2010/0284236 A1* | 11/2010 | Franz | B29C 48/04 366/75 |
| 2020/0282598 A1* | 9/2020 | Schotzau | B29C 48/45 |
| 2020/0282599 A1* | 9/2020 | Hawley | B29C 48/2886 |

OTHER PUBLICATIONS

Tokihisa, et al., "Extensional Flow Mixer for Polymer Nanocomposites", Polymer Engineering & Science / vol. 46, issue 8, 2006.

Carson, et al., "A new extensional mixing element for improved dispersive mixing in twin-screw extrusion, Part 2: experimental validation for immiscible polymer blends", Advances in Polymer Technology, vol. 0, 2016.

Carson, et al., "A new extensional mixing element for improved dispersive mixing in twin-screw extrusion, Part 1: diesign and computational validation", Advances in Polymer Technology, vol. 0, 2015.

\* cited by examiner

MIXING ELEMENT HAVING PROJECTIONS DEFINING CHANNELS OF VARYING WIDTH AND DEPTH FOR EXTRUSION OPERATIONS

RELATED APPLICATIONS

This application claims the benefit of U.S. Provisional Appln. Ser. No. 62/667,124, filed May 4, 2018, the entirety of which is incorporated by reference herein.

GOVERNMENT FUNDING

This invention was made with government support under Grant No. NSF IIP-1640680 awarded by The National Science Foundation. The United States government has certain rights in the invention.

TECHNICAL FIELD

The present invention relates generally to screw extruders and, more specifically, relates to extensional mixing elements for improving dispersive mixing in screw extruding operations.

BACKGROUND

Extrusion is a common and important operation in polymer processing. Extruders are therefore a fundamental part of any extrusion and compounding lines. The most widespread types of extruders are single screw extruders (SSE) and intermeshing, co-rotating, twin screw extruders (TSE). Current technology, however, provides relatively poor mixing between different polymer systems.

Two main types of mixing are required for compounding operations. The first is dispersive mixing, whereby large stresses are applied to a material and lead to the dispersion of the dispersed phase. Dispersion is shear-dominated and relies on shear stress to overcome adhesion between agglomerated particles (in solids) and overcomes surface tension between particles to break up droplets (in liquids).

The second is distributive mixing, whereby large strains are applied to the materials in order to distribute the disperse phase as homogeneously as possible in the matrix. Consequently, if one wants to break agglomerate (dispersed phase), one needs to improve dispersive mixing, i.e., to apply larger stresses without compromising on wear and tear of the machine. With this in mind, shear flows are energetically inefficient for dispersive mixing by comparison with extensional flows. In other words, extensional flow is more efficient and better promotes agglomerate breakup. Consequently, extensional mixing elements (EME) were developed to focus on utilizing extensional flow to better break up aggregates into small particles.

SUMMARY

A new and improved extensional mixing element (EME) is proposed to improve the mixing efficiency in the extrusion process by providing extension-dominated flow through hyperbolically contracting channels instead of shear-dominated flow.

In accordance with the present invention, an example mixing element is provided for an extruder screw having a width extending in an x-direction of an x-y-z coordinate system, a length extending in a y-direction, and a thickness extending in a z-direction. The mixing element includes a base defining a passage extending along an axis for receiving the extruder screw. Projections extend radially outward from the base and define channels therebetween. The width and the depth of each channel vary along the length of the channel.

In another aspect of the present invention, a mixing element is provided for an extruder screw has a width extending in an x-direction of an x-y-z coordinate system, a length extending in a y-direction, and a depth extending in a z-direction. The mixing element includes a base defining a passage extending along and encircling an axis in the y-direction for receiving the extruder screw. Projections extend radially outward from the base and define channels therebetween. The width of each channel varies long the length. Each channel has a geometric center in the y-direction. The depth of each channel decreases from an inlet to the geometric center and increases from the geometric center to an outlet.

In another aspect of the present invention, a mixing element is provided for a pair of extruder screws having a width extending in an x-direction of an x-y-z coordinate system, a length extending in a y-direction, and a depth extending in a z-direction. The mixing element includes a pair of integrally formed bases each defining a passage extending along an axis in the y-direction for receiving one of the extruder screws. Projections extend radially outward from each base and define channels therebetween. The width and the depth of each channel varying along the length of the channel.

Other objects and advantages and a fuller understanding of the invention will be had from the following detailed description and the accompanying drawings.

DETAILED DESCRIPTION

The present invention relates generally to screw extruders and, more specifically, relates to extensional mixing elements (EME) for improving dispersive mixing in screw extruding operations. In dispersive mixing, increasing the elongation component of the polymer flow increases the degree of dispersive mixing, particularly when done in multiple planes/dimensions. For polymer blends/composites, the final properties of the products produced depend on the mixing quality. This can be improved by incorporating more extensional flows.

To this end, the mixing elements of the present invention produce extensional flow in or more directions, e.g., along the width and/or depth of the flow path. In one example, the mixing elements have hyperbolic, convergent-divergent flow paths in multiple directions to induce extensional flow in multiple planes, thereby increasing the degree of mixing within the polymer flow.

Figure 1:
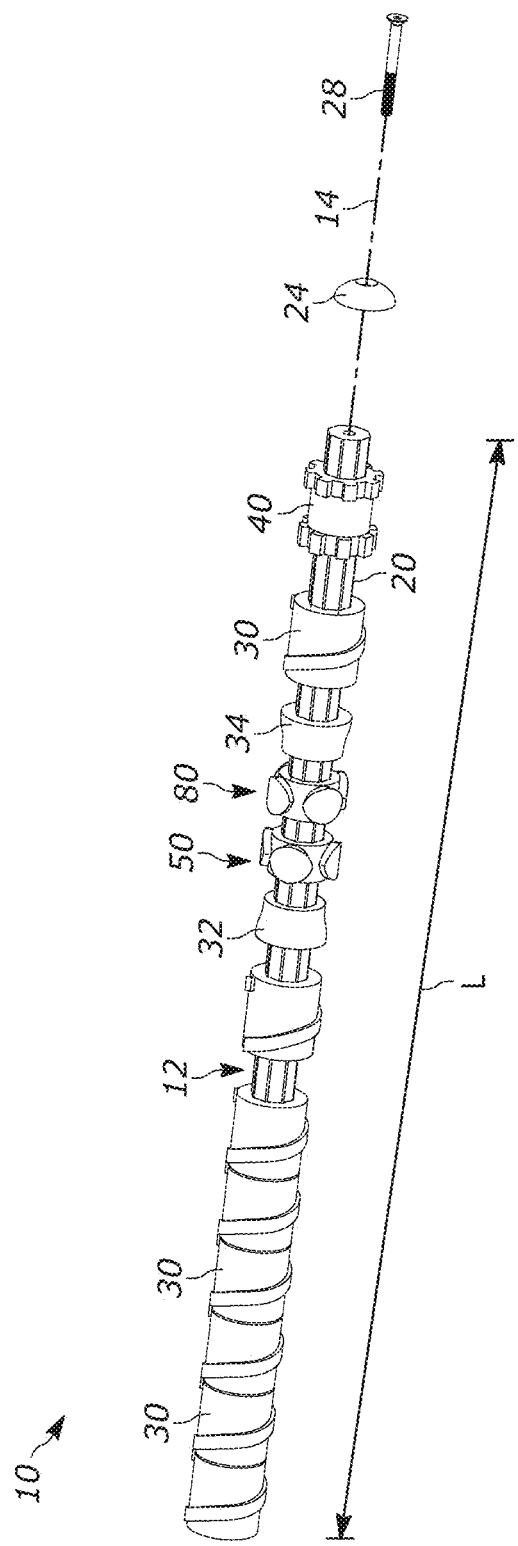
FIG. 1 is a schematic illustration of a single screw extruder (SSE) assembly with example extensional mixing elements (EME) in accordance with the present invention.

FIG. 1 is an example screw extruder 10 for use in an extrusion device. As shown, the screw extruder 10 is used in a single screw extruder (SSE). The extruder 10 includes a shaft 12 extending along an axis 14. The extruder 10 has a length L along the axis and is formed from a collection of modular segments positioned along the shaft 12 and serving a range of purposes in the extrusion process. The segments can include, for example, metering elements 30, ramp elements 32, 34, feed screws and/or bushings (not shown), distributive mixers, e.g., pineapple elements 40, and one or more extensional mixing elements (EME) 50 in accordance with the present invention.

The shaft 12 has an outer surface 20 that can be circular or polygonal, e.g., octagonal or hexagonal, and is configured to mate with the modular segments 30, 32, 34, 40, 50. A cap 24 is secured to an end of the shaft 12 with a fastener 28, which maintains the modular segments 30, 32, 34, 40, 50 on the shaft 12 during operation thereof. As shown, the EME 50, 120 are positioned axially between the ramp elements 32, 34 and upstream of the pineapple element 40. Other arrangements of mixing elements are contemplated.

Figure 2A:
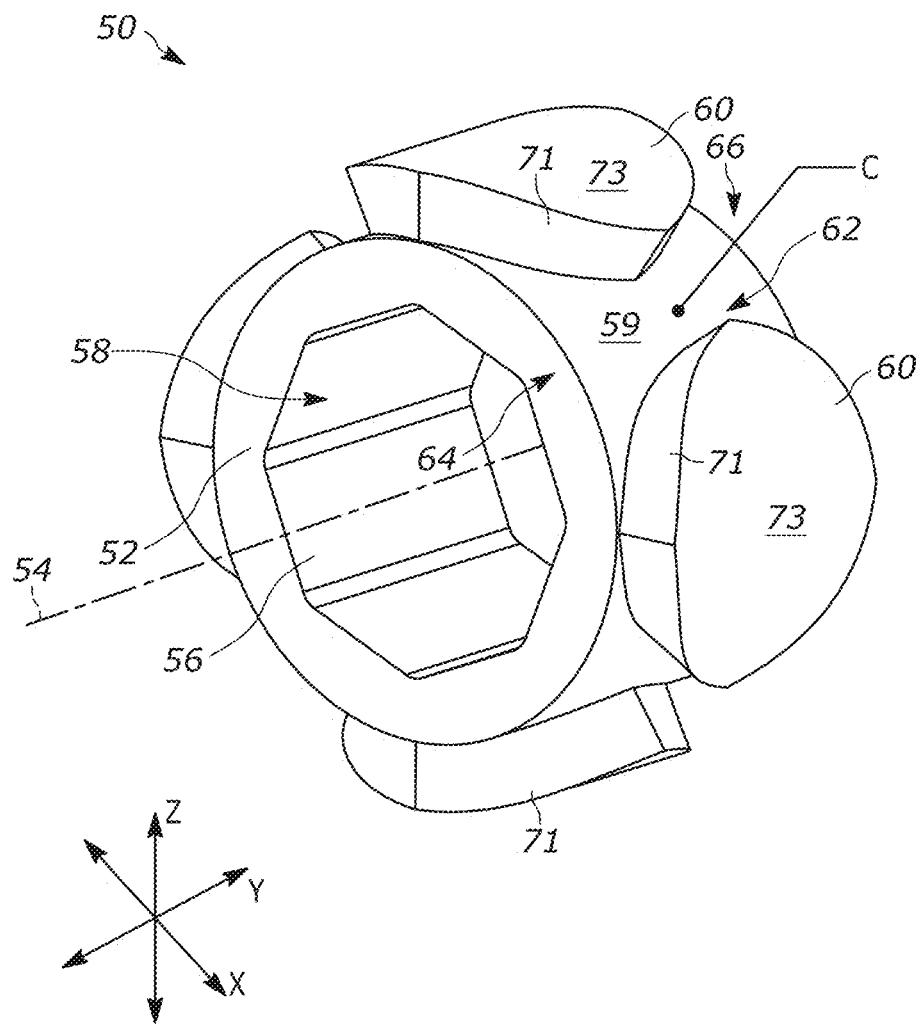
FIG. 2A is a front view of the SSE EME of FIG. 1.
Figure 2B:
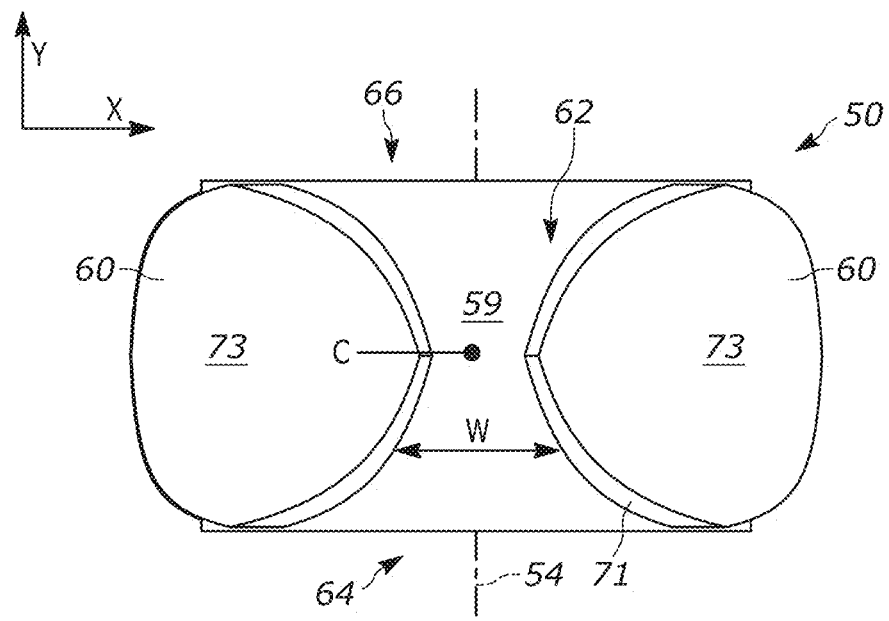
FIG. 2B is a top view of the SSE EME of FIG. 2A.
Figure 2C:
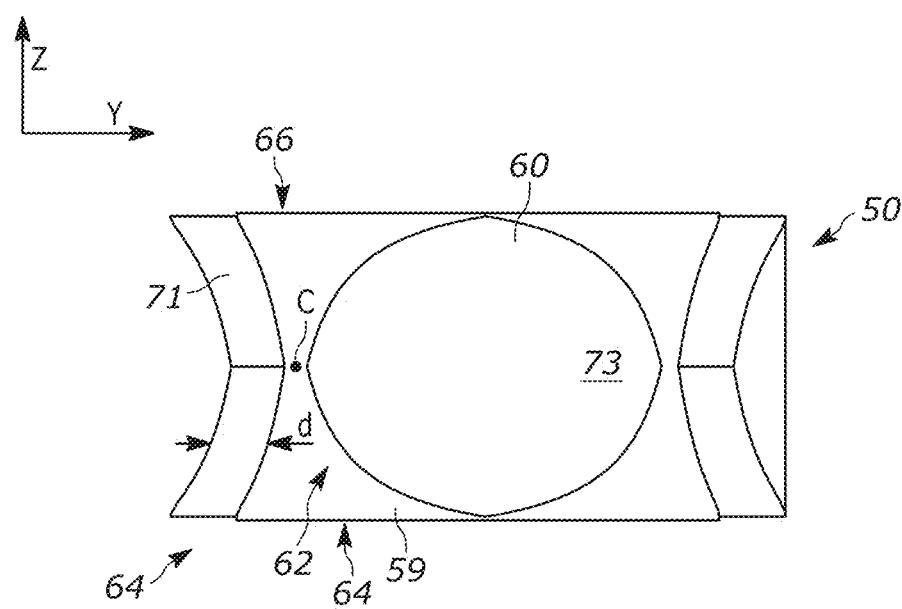
FIG. 2C is a side view of the SSE EME of FIG. 2A.

One example EME 50 is shown in FIGS. 2A-2C. Referring to FIG. 2A, the EME 50 includes a hollow base 52 centered about and extending along an axis 54. The base 52 includes a curved outer surface 59. An inner surface 56 defines a passage 58 extending the length of the EME 50. The inner surface 56 has the same shape as the outer surface 20 of the extruder 10.

As shown, the base 52 is circular and projections 60 are positioned about the circumference of the base. Each projection 60 includes an outer or peripheral surface 71 that can be substantially perpendicular to the outer surface 59. The projections 60 extend radially outward from the outer surface 59 to a radially outer surface 73. In one example, the projections 60 are polygonal in shape, e.g., generally oval, and are curved along the contour of the outer surface 59. Other shapes and contours are contemplated.

The projections 60 are arranged in a pattern around the axis 54. The projections 60 can be symmetrically (as shown) or asymmetrically (not shown) arranged about the base 52. Each projection 60 can be identical to or different from one another. Although four projections 60 are shown it will be appreciated that more or fewer projections can be provided, e.g., six or eight projections.

Flow channels 62 are defined between adjacent pairs of projections 60. In an x-y-z coordinate system, the x-direction defines the width (w) of the channels 62. The y-direction defines the length (l) of the channels 62 and is bounded by an inlet 64 and an outlet 66. A geometric center of the channel 62 along the length (l) is indicated at C. The z-direction defines the depth (d) of the channels 62. The depth (d) is defined between the outer surface 59 and the radially outer surface 73. The overall size of the channels 62 is dependent upon the diameter of the extruder 10.

The projections 60 and outer surface 59 are configured such that the dimensions of each channel 62 changes in one or more directions. In one example, the channels 62 have a converging-diverging (CD) shape along their length. The CD shape can be hyperbolic and provide single hyperbolic contraction for polymer flow through the EME 50.

A hyperbolic-shaped channel 62 provides a flow velocity that increases linearly towards the center C of the channel along the length (l) of the flow. This causes pure extensional flow at the center C, with extensionally dominated flow along the longitudinal cross-section of the channel 62. Several design constraints are taken into account when configuring the projections 60—and therefore the channels 62—of the EME 50. More specifically, the degree of hyperbolic CD (determined by an equation), the number of channels 62 between projections 60 on each EME 50, the horizontal contraction ratio, and the vertical contraction ratio are all taken into account.

In one example, the hyperbolic CD profile is dictated by the following equation:

$$y = \frac{0.0183}{(0.0624 + x)} \qquad \text{Eq. 1}$$

where x=0 to 0.187. More specifically, Eq. 1 defines the curvature of each peripheral surface 71 on opposite sides of the center C, which cooperate to define a single channel 62. With this in mind, x=0 at the inlet 64 and x=0.187 at the center C. Eq. 1 can be used or modified to provide a horizontal contraction ratio (change in width (w)) of from about 2:1 to about 4:1.

That said, the EME 50 in FIGS. 2A-2B provides single hyperbolic mixing. The width (w) of the channels 62 changes along the length (l) based on Eq. 1. More specifically, the width (w) is at a maximum at the inlet 64, decreases according to Eq. 1 to a minimum at the center C, and increases according to Eq. 1 back to the maximum at the outlet 66. The depth (d) of the channels 62 is constant, i.e., the vertical contraction ratio is 1:1

Figure 3A:
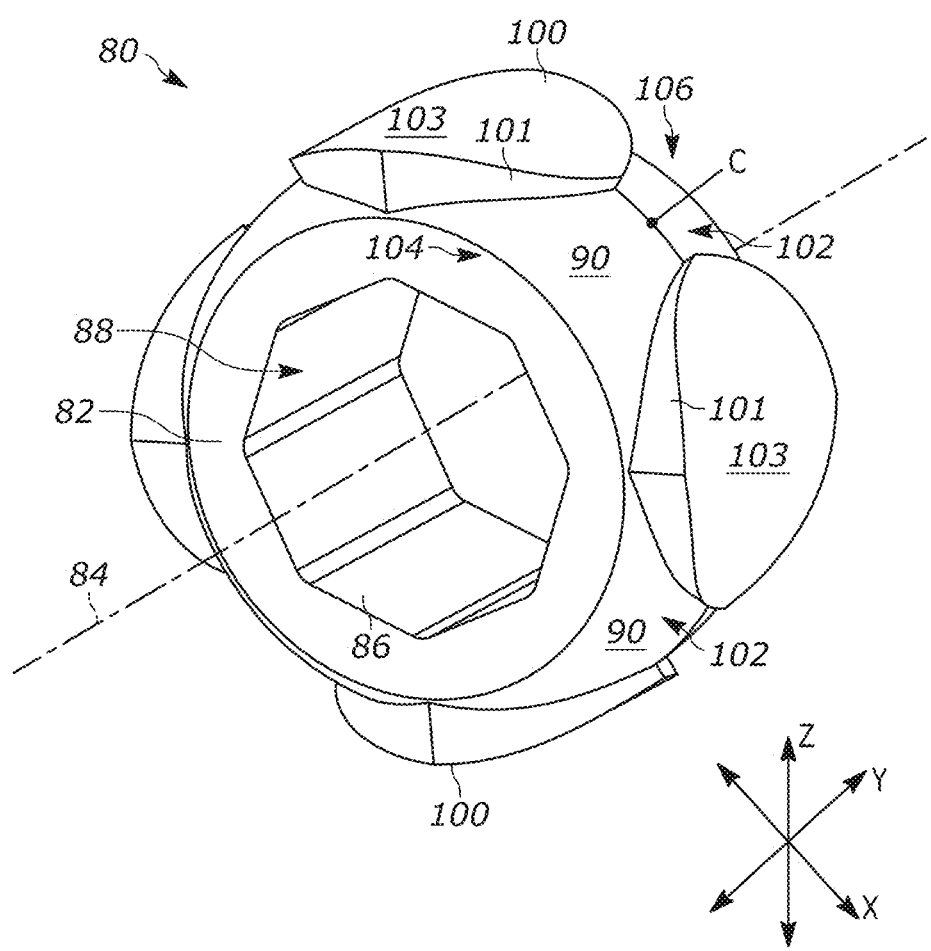
FIG. 3A is a front view of another example SSE EME.
Figure 3B:
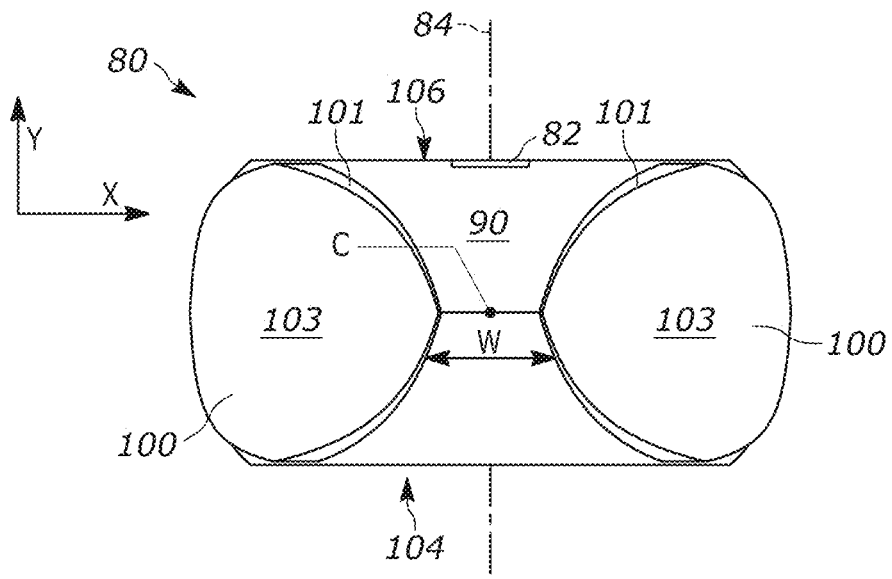
FIG. 3B is a top view of the SSE EME of FIG. 3A.
Figure 3C:
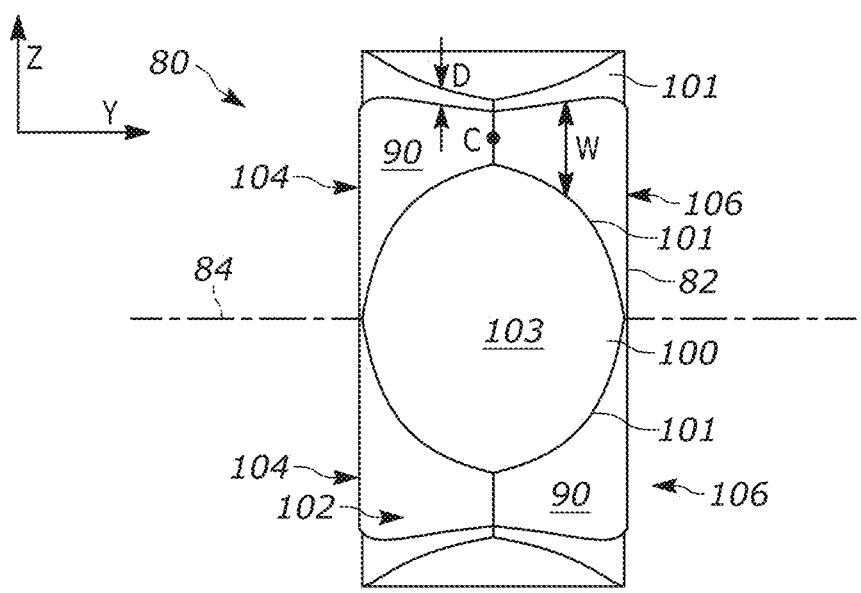
FIG. 3C is a side view of the SSE EME of FIG. 3A.

The EME can be made more aggressive in mixing the polymer flow by providing double contraction, i.e., contraction in both the x-y plane and the y-z plane, in order to impart extensional flow in both planes. To this end, FIGS. 3A-3C illustrate an example EME 80 providing double hyperbolic mixing.

The EME 80 includes a hollow base 82 centered about and encircling an axis 84. The base 82 includes a curved outer surface 90. An inner surface 86 defines a passage 88 extending the length of the EME 80. The inner surface 86 has the same shape as the outer surface 20 of the extruder 10.

As shown, the base 82 is circular and projections 100 are positioned about the circumference of the base. Each projection 100 includes an outer or peripheral surface 101 that can be substantially perpendicular to the outer surface 90. The projections 100 extend radially outward from the outer surface 90 to a radially outer surface 103. In one example, the projections 100 are polygonal in shape, e.g., generally oval, and are curved along the contour of the outer surface 90. Other shapes and contours are contemplated.

The projections 100 are arranged in a pattern around the axis 84. The projections 100 can be symmetrically (as shown) or asymmetrically (not shown) arranged about the base 82. Each projection 100 can be identical to or different from one another. Although four projections 100 are shown it will be appreciated that more or fewer projections can be provided, e.g., six or eight projections.

Flow channels 102 are defined between adjacent pairs of projections 100. The x-direction defines the width (w) of the channels 102. The y-direction defines the length (l) of the channels 102 and is bounded by an inlet 104 and an outlet 106. The z-direction defines the depth (d) of the channels 102. The depth (d) is defined between the outer surface 90 and the radially outer surface 103. The overall size of the channels 102 is dependent upon the diameter of the extruder 10.

The projections 100 and outer surface 90 are configured such that the dimensions of the channels 102 changes in multiple directions, namely, the width (w) and the depth (d). In one example, the channels 102 have a converging-diverging (CD) shape along their length (l) in multiple directions. The CD shape can be hyperbolic and can provide double hyperbolic contraction.

In one example, the hyperbolic CD profile of the peripheral surface 101 and the width (w) is dictated by Eq. 1. The hyperbolic CD profile of the depth (d) is dictated by the following equation:

$$y = \frac{0.0051}{(0.062 + x)} \quad \text{Eq. 2}$$

where x=0 to 0.187. More specifically, Eq. 2 dictates the curvature of the outer surface 90 with the apex of the hyperbola being at the center C and the legs extending towards the inlet 104 and outlet 106. With this in mind, x=0 at the inlet 104 and x=0.187 at the center C. Eq. 2 can be used or modified to provide a vertical contraction (change in depth (d)) ratio of from greater than 1:1 to about 4:1.

That said, the distance between the outer surface 90 and the axis 84 varies. Since the outer surfaces 103 are spaced a constant distance from the axis 84, varying the distance between the outer surface 90 and the axis 84 necessarily varies the depth (d) of the channel 102. In this case, the depth (d) is lowest at the center C and increases based on Eq. 2 along the y-axis in both directions until the channel 102 reaches its maximum depth at the inlet 104 and outlet 106.

Figure 4A:
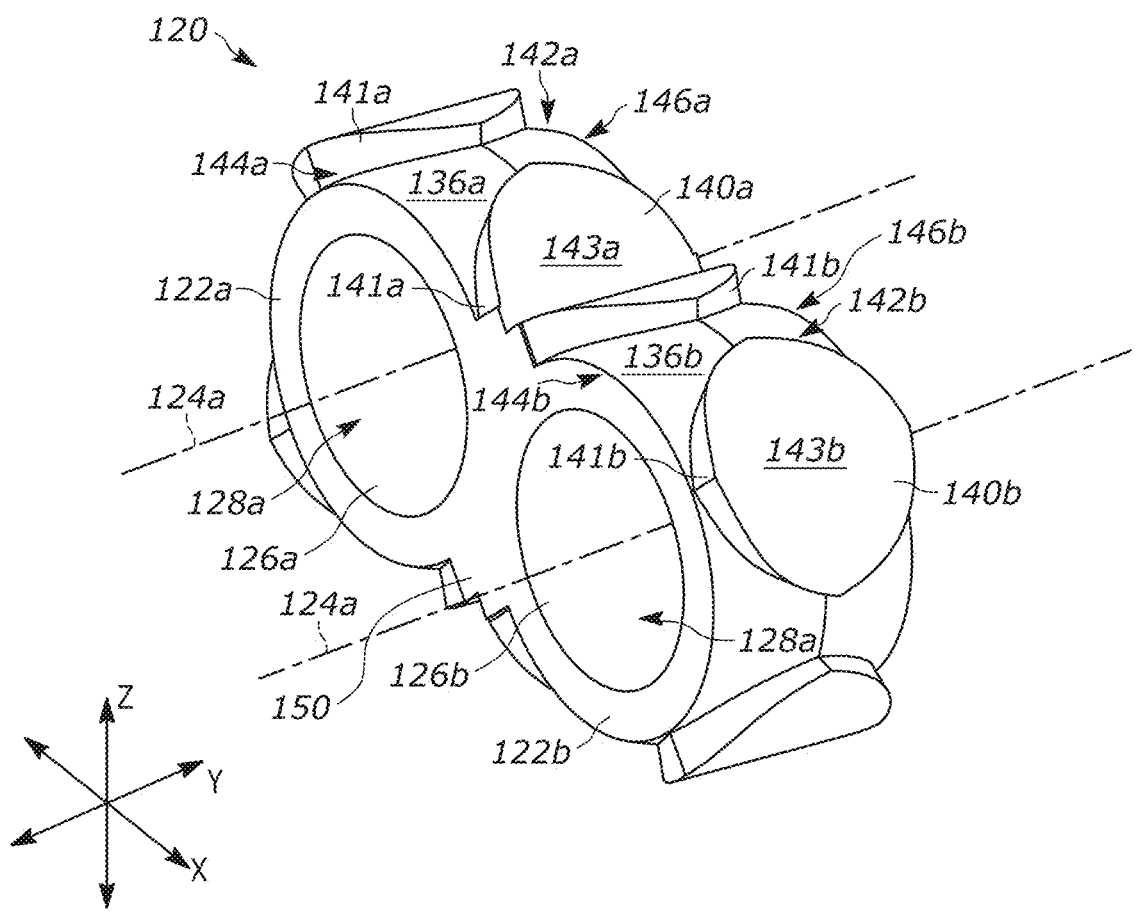
FIG. 4A is a front view of an example EME for a twin screw extruder (TSE) assembly.
Figure 4B:
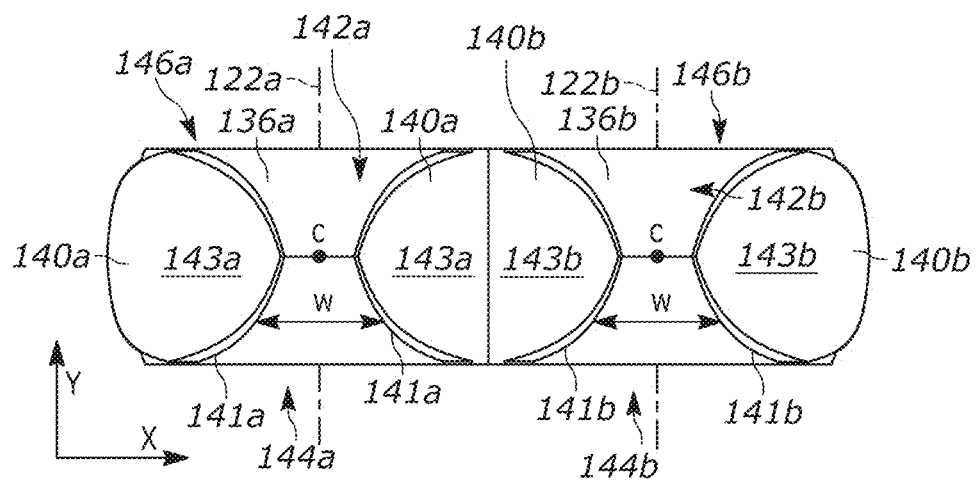
FIG. 4B is a top view of the TSE EME of FIG. 4A.
Figure 4C:
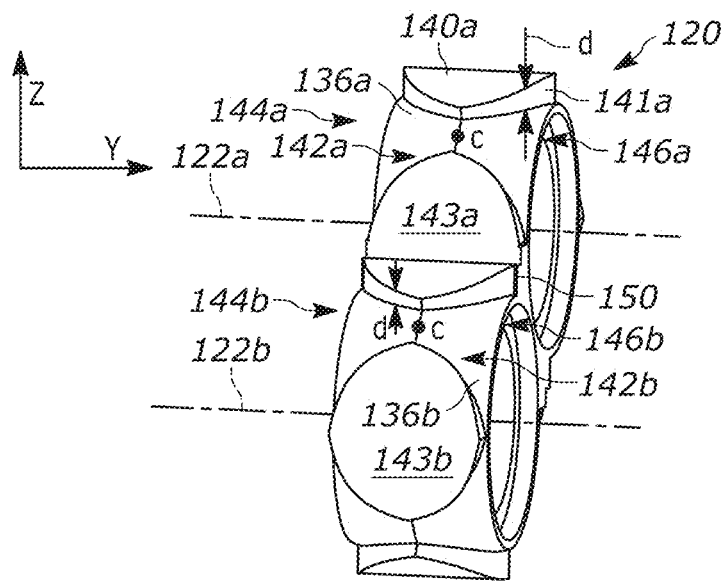
FIG. 4C is a side view of the TSE EME of FIG. 4A.

FIGS. 4A-4C illustrate an example EME 120 for use with twin screw extruders (TSE). In TSE, two of the shafts 12 (see FIG. 1) are provided. Each shaft 12 extends through the same EME 120 and corresponding modular segments 30, 32, 34, 40 along parallel axes 14. In operation, the shafts 12 counter-rotate relative to one another about their respective axes 14 (not shown).

Referring to FIG. 4A, the TSE EME 120 comprises a pair of SSE EMEs integrally formed together. To this end, the EME 120 includes a base formed from a pair of portions 122a, 122b integrally formed with or connected to one another along an interface 150. In other words, the portions 122a, 122b in FIG. 4A are themselves individual bases interconnected to form a single, collective base of the EME 120. Since the pair of portions 122a, 122b are interconnected to form a single, collective base, the TSE EME 120 is static and do not rotate with the shafts 12. That said, features in FIGS. 4A-4C that are similar to features of the SSE EME of FIGS. 3A-3C are given reference numbers 40 greater than the corresponding feature in FIGS. 3A-3C, except for the outer surfaces 136a, 136b of the portions 122a, 122b. Moreover, the suffixes "a" and "b" are used to differentiate elements associated with the portion 122a from elements associated with the portion 122b.

The portions 122a, 122b are oriented such that the respective axes 124a, 124b extend parallel to one another and, thus, the passages 128a, 128b extend parallel to one another. Furthermore, the projections 140a, 140b are provided in the same x-z plane, i.e., the projections 140a are not offset from the projections 140b in the y-direction. A pair of projections 140a intersects the interface 150. A similar pair of projections 140b also intersects the interface 150. As shown, this occurs at the top and bottom of the EME 120. In any case, the projections 140a, 140b along the interface 150 abut one another.

The projections 140a, 140b each define respective channels 142a, 142b providing double hyperbolic mixing. The width (w) of each channel 142a, 142b can change along the length (l) according to Eq. 1. The depth (d) of each channel 142a, 142b can change along the length (l) according to Eq. 2. One or both of Eqs. 1 and 2 can be modified to adjust the horizontal and/or vertical contraction of the channels 142a, 142b, e.g., to provide more aggressive or less aggressive contraction. Regardless, the channels 142a, 142b converge from the inlets 144a, 144b to the center C and diverge from the center to the outlets 146a, 146b.

Figure 5:
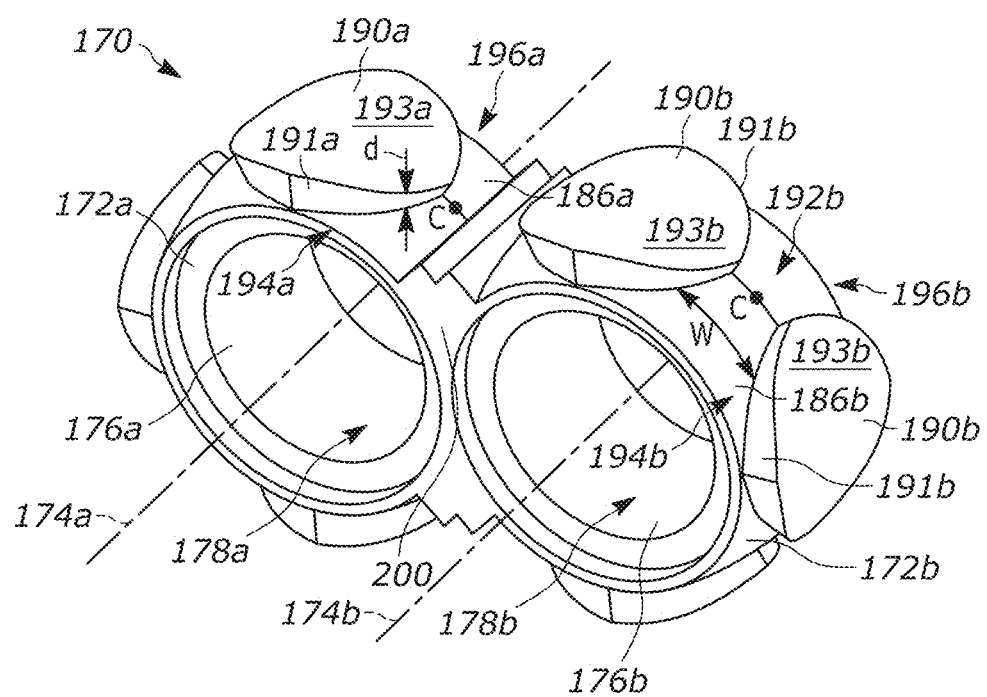
FIG. 5 is a front view of another example TSE EME.

FIG. 5 illustrates a TSE EME 170 that is a modified version of the TSE EME 120. Features in FIG. 5 that are the same as features in FIGS. 4A-4C are given reference numbers 50 greater than the corresponding feature in FIGS. 4A-4C. The "a" and "b" suffixes are maintained for clarity. That said, unlike the EME 120, none of the projections 190a, 190b on the EME 170 intersect the interface 200. Consequently, none of the projections 190a, 190b abut one another.

Figure 6A:
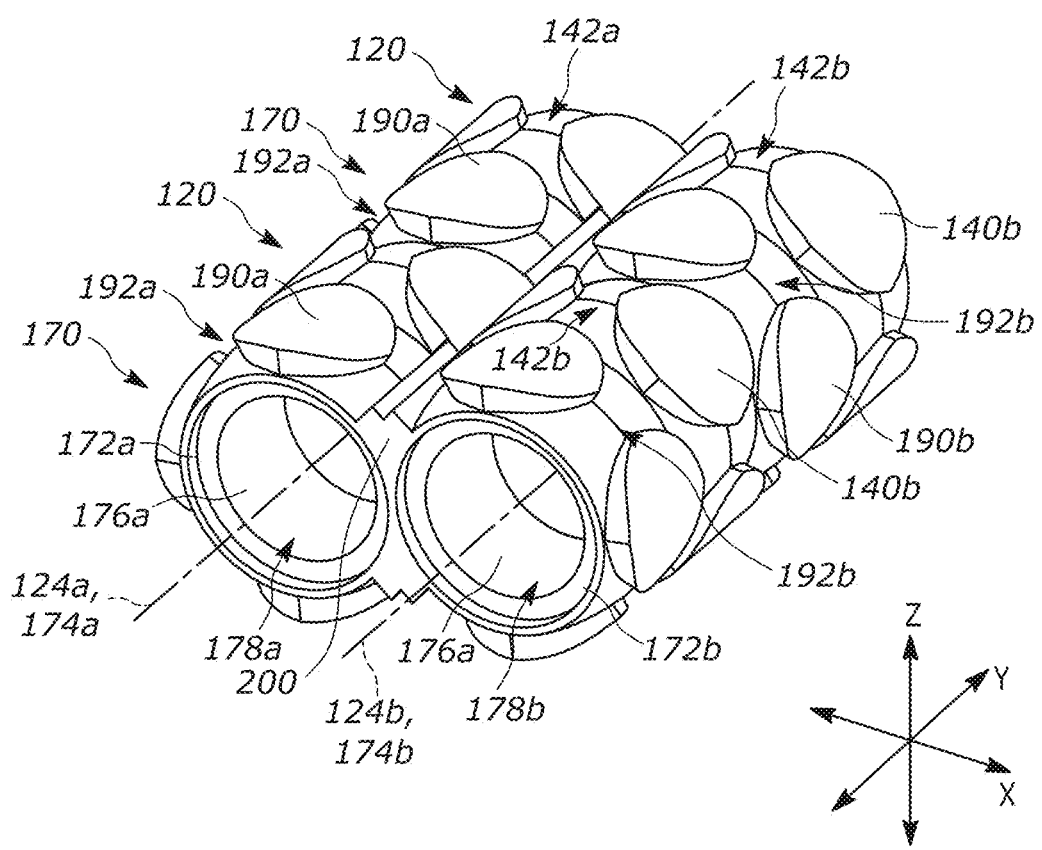
FIG. 6A is a front view of an arrangement of alternating TSE EMEs.
Figure 6B:
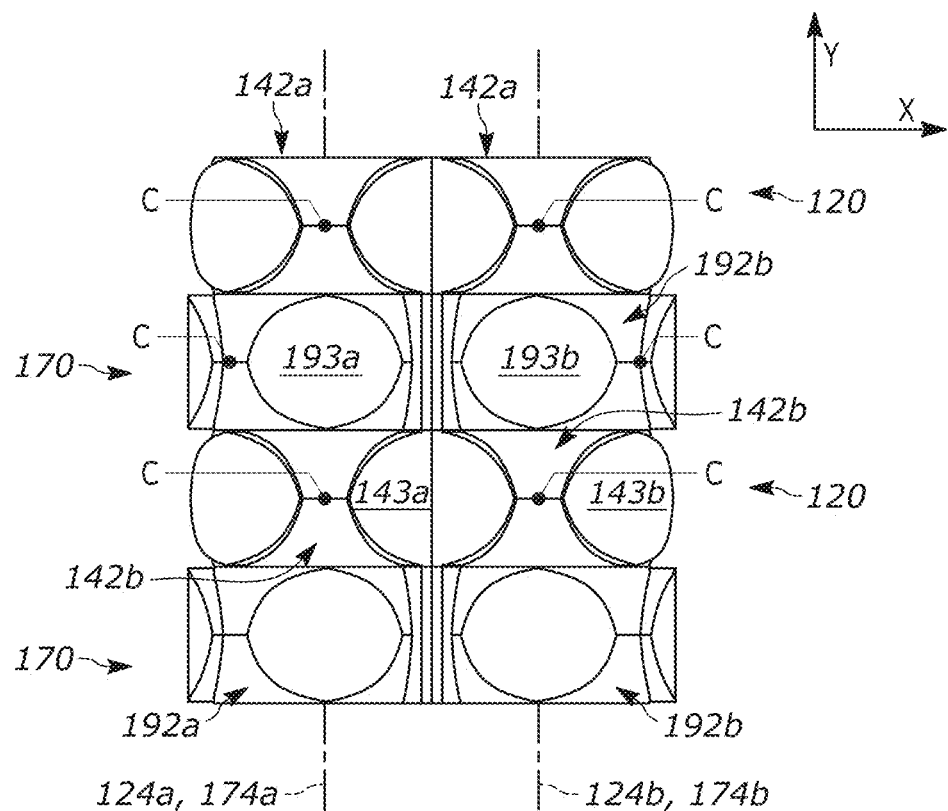
FIG. 6B is a top view of the arrangement of FIG. 6A.

FIG. 6A illustrates a series of TSE EME 120, 170 axially aligned with one another in an alternating manner. More specifically, the axes 124a, 174a are aligned with one another. The axes 124b, 174b are aligned with one another. The interfaces 150, 200 are co-planar in the y-z plane. As a result, the channels 142a, 192a are offset from one another in the x-direction. The channels 142b, 192b are offset from one another in the x-direction. Due to this arrangement, fluid flow through the EME 120, 170 moves in a zig-zag manner between channels 142a, 192a and in a zig-zag manner between channels 142b, 192b.

The testing and simulations showed that adding EMEs to pineapple mixing screw does not necessarily change pressure build up. Adding EMEs significantly decreased the aggregate size for composite polymer materials. Double hyperbolic EMEs work better for higher viscosity ratios in polymer blends.

Example 1

Figure 7:
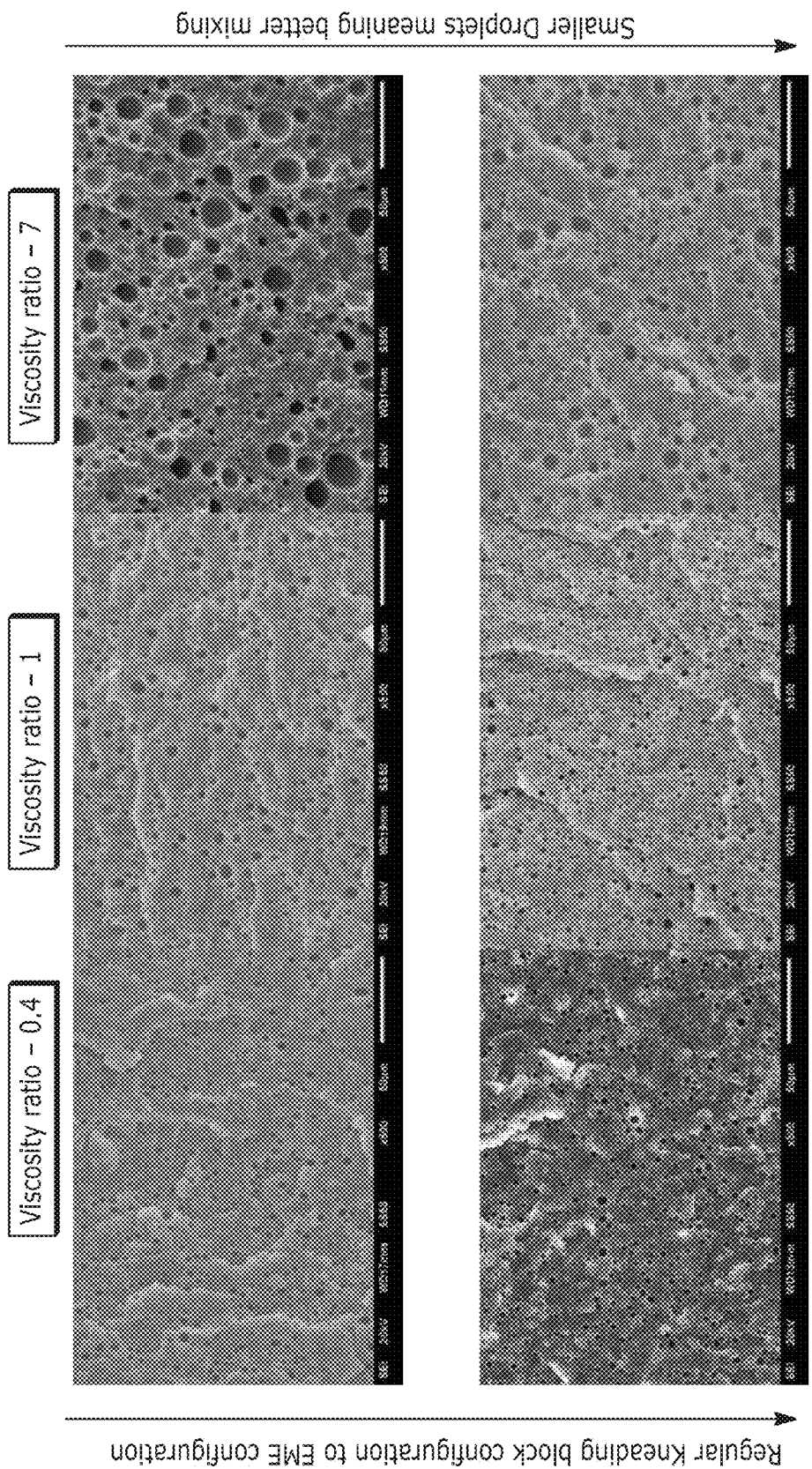
FIG. 7 shows SEM images comparing mixing between a kneading block and an EME according to the present invention.

A knead block element and a single hyperbolic EME were used in the twin screw extrusion of polystyrene (PS)/polypropylene (PP) blends having different viscosities, namely, viscosity ratios of 0.4, 1.0, and 7.0. SEM images shown in FIG. 7 illustrate that using hyperbolic EME improved mixing over knead block elements over a range of viscosity ratios ($\eta_r$).

Figure 8:
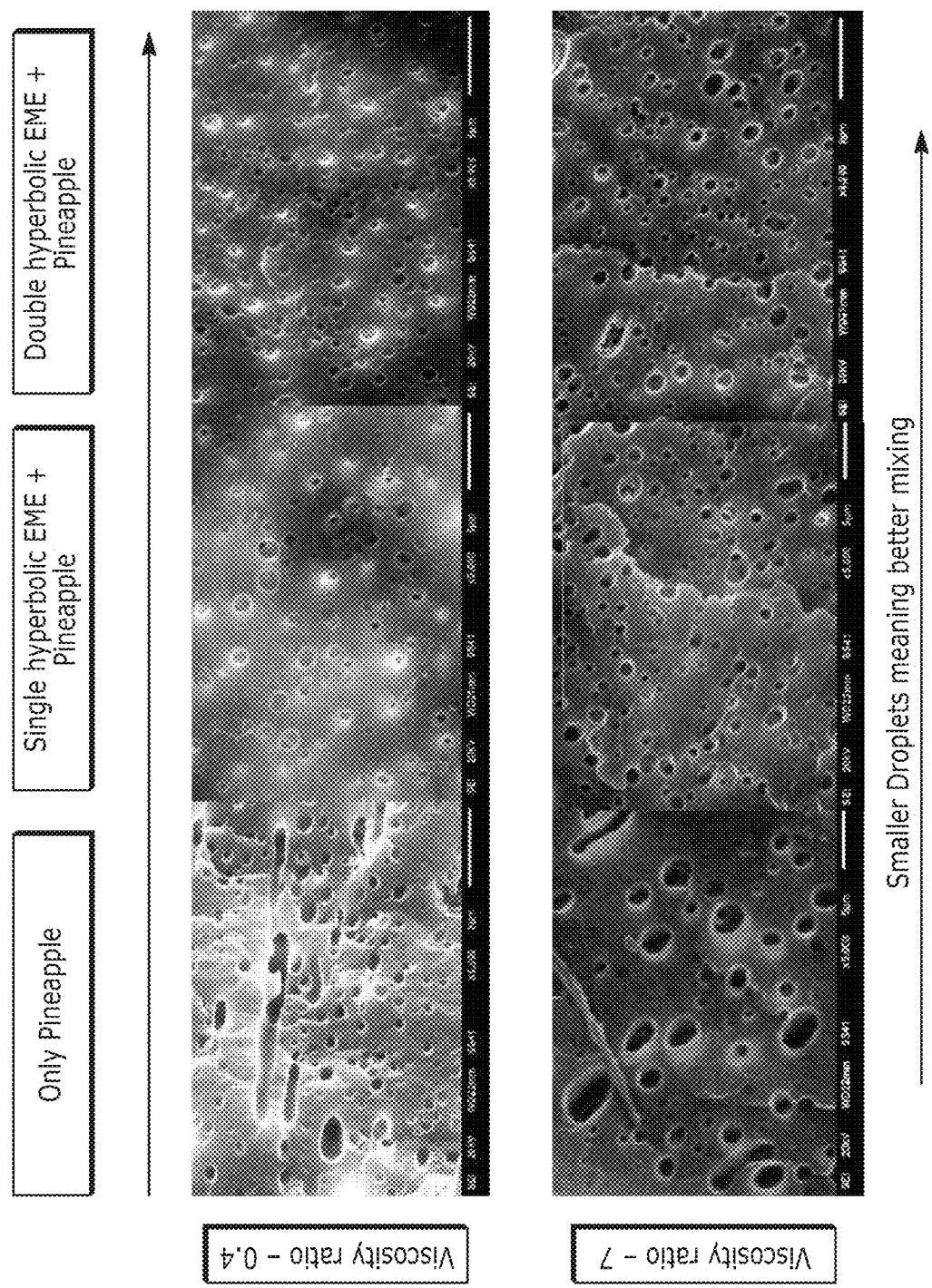
FIG. 8 shows SEM images comparing mixing between a pineapple element and an EME in accordance with the present invention.

The same blends having viscosities of 0.4 and 7.0 were extruded using only pineapple elements, a single hyperbolic EME with a pineapple element, and a double hyperbolic EME with a pineapple element. The SEM images shown in FIG. 8 illustrate improved mixing for the double hyperbolic EME compared to both the single hyperbolic EME and the pineapple element.

Example 2

In this study, mixing and flow characteristics were examined for EMEs having different configurations. A mixing index ($\lambda$) was used to quantify the degree of shear vs. extension and thereby quantify the elongation component. The mixing index ($\lambda$) was calculated by the following equation:

$$\lambda = \frac{|D|}{|D| + |\omega|} \qquad \text{Eq. 3}$$

where D is the rate of deformation tensor; and
$\omega$ is the vorticity tensor
The quantified mixing index ($\lambda$) can be interpreted as follows:
$\lambda=0$ indicates pure rotational flow;
$\lambda=0.5$ indicates shear flow; and
$\lambda=1$ indicates pure extensional flow.

The greater the mixing index ($\lambda$) exceeded 0.5, the larger the extensional component and the greater the dispersive mixing. In other words, volumes having a mixing index ($\lambda$) greater than 0.5 appear to increase in extensional flow with more contraction times in the channels. It is desirable to consider both the mixing index ($\lambda$) and the pressure drop when configuring the mixing element. A higher inlet pressure drop will produce greater extensional flow.

Figure 9:
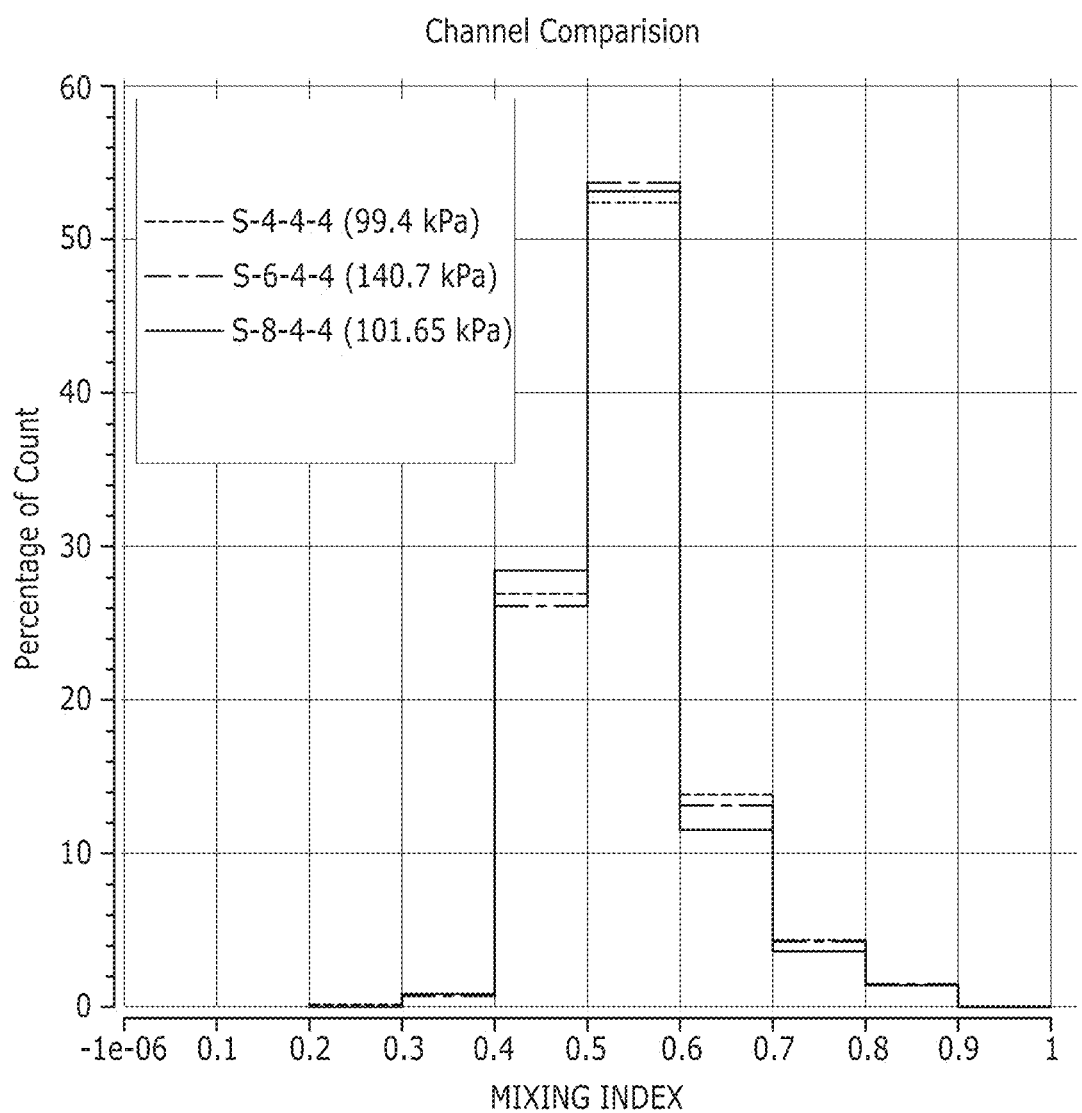
FIG. 9 is a graph comparing mixing indices of SSE EMEs having different numbers of channels.

In FIG. 9, SSE mixing elements having different numbers of channels were tested. The contraction length (short), horizontal contraction ratio (4:1), and vertical contraction ratio (4:1) for each mixing element were the same. Four, six, and eight channels were tested, with four channels appearing to work best. More specifically, using four channels produced the greatest amount of mixing index ($\lambda$) greater than 0.5.

Figure 10:
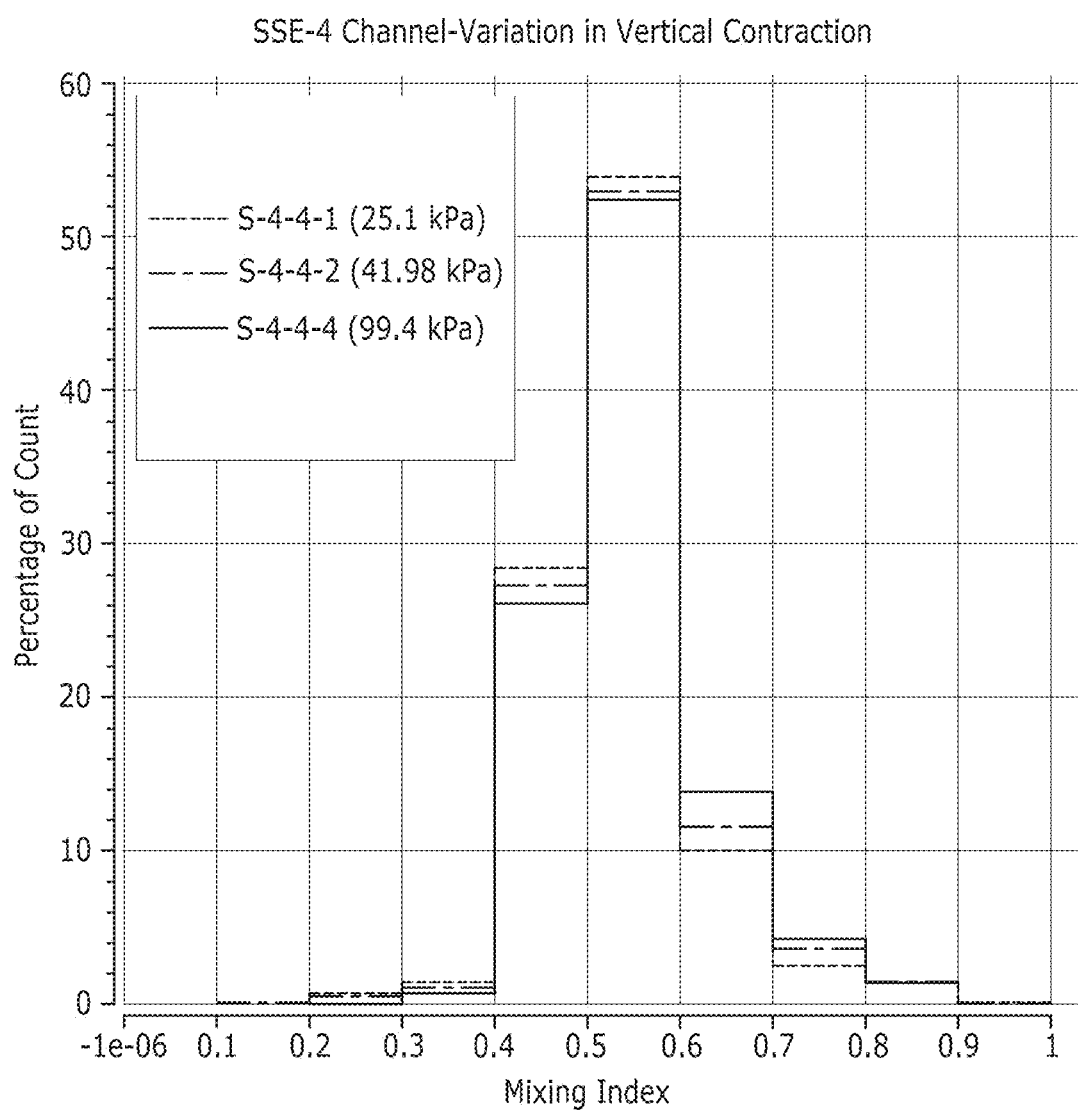
FIG. 10 is a graph comparing mixing indices of SSE EMEs having different vertical contraction ratios.

In FIG. 10 each SSE mixing element had four channels but different vertical contraction ratios. The contraction length (short) and horizontal contraction ratio (4:1) for each mixing element were the same. A 1:1 vertical contraction ratio (none) was chosen for the mild mixing SSE EME and a 4:1 vertical contraction ratio was chosen for the aggressive mixing SSE EME. The more aggressive 4:1 vertical contraction ratio produced the greatest amount of mixing index ($\lambda$) greater than 0.5.

Figure 11:
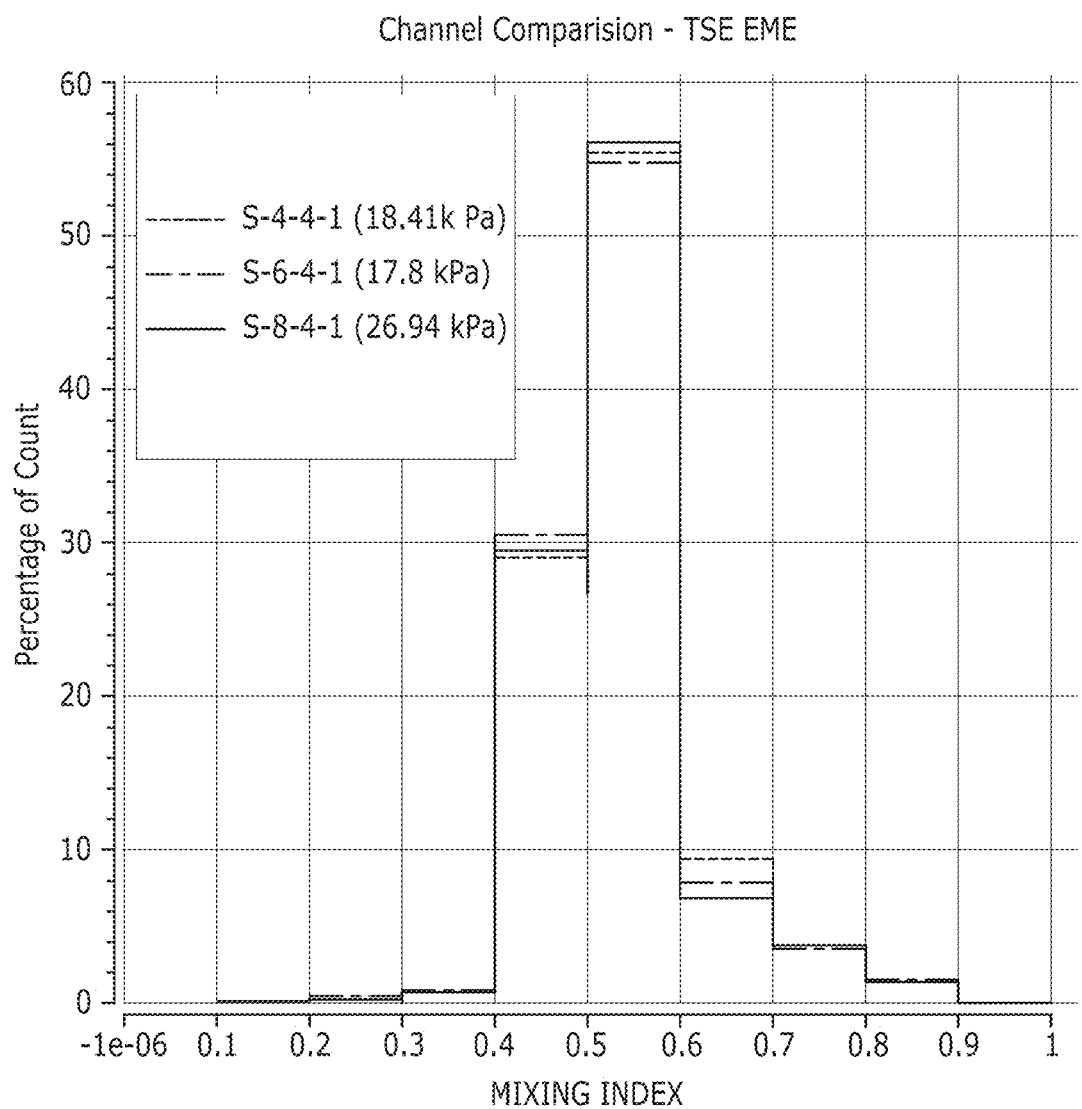
FIG. 11 is a graph comparing mixing indices of TSE EMEs having different numbers of channels.

In FIG. 11, TSE mixing elements had different numbers of channels. The contraction length (short), horizontal contraction ratio (4:1), and vertical contraction ratio (1:1) for each mixing element were the same. Four, six, and eight channels were tested, with four channels appearing to work best.

Figure 12:
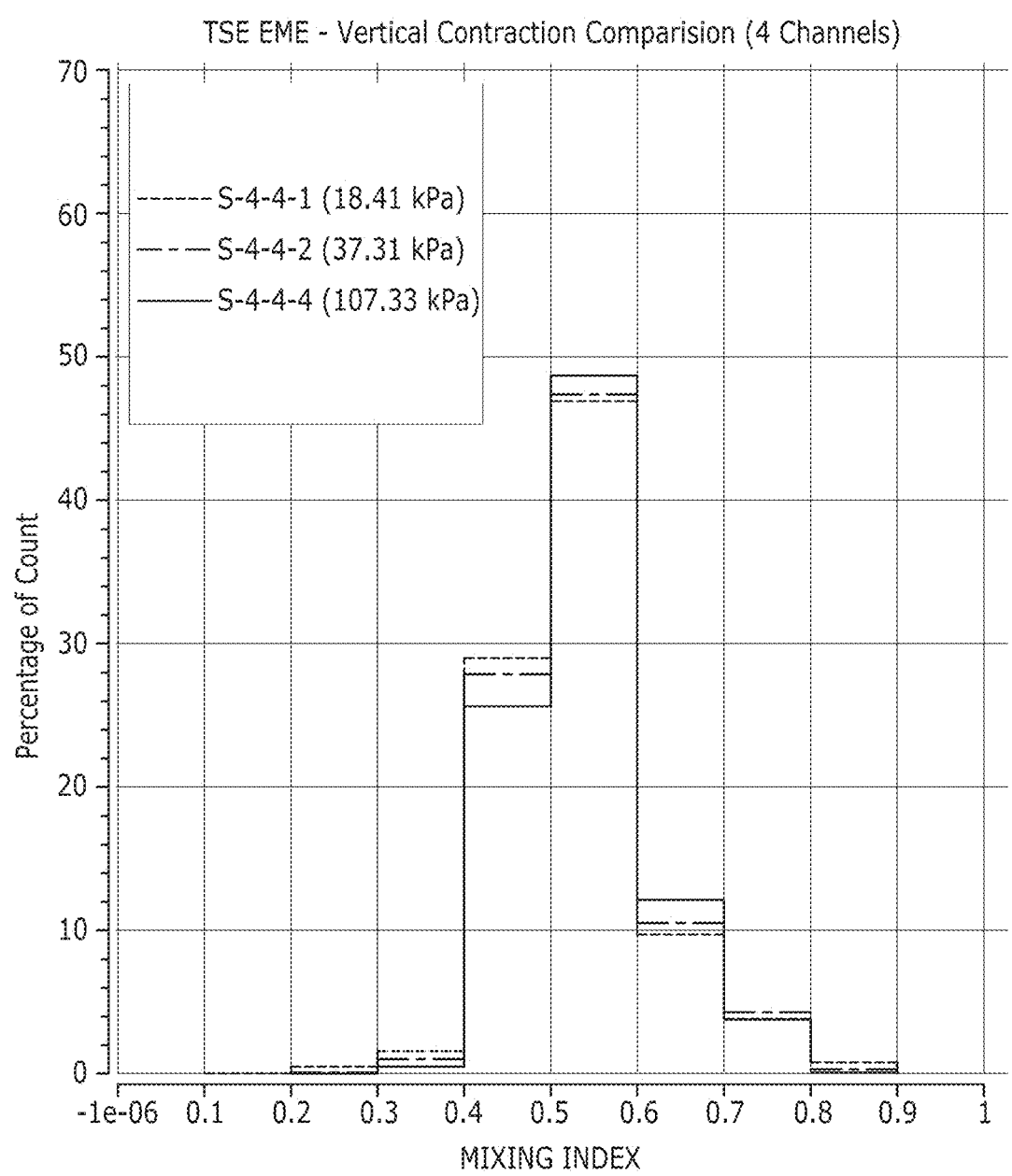
FIG. 12 is a graph comparing mixing indices of TSE EMEs having different vertical contraction ratios.

In FIG. 12 each TSE mixing element had four channels but different vertical contraction ratios. The contraction length (short) and horizontal contraction ratio (4:1) for each mixing element were the same. A 1:1 vertical contraction ratio (none) was chosen for the mild mixing TSE EME and a 4:1 vertical contraction ratio was chosen for the aggressive mixing TSE EME. The aggressive 4:1 vertical contraction ratio produced the greatest amount of mixing index ($\lambda$) greater than 0.5.

Example 3

Figure 13:
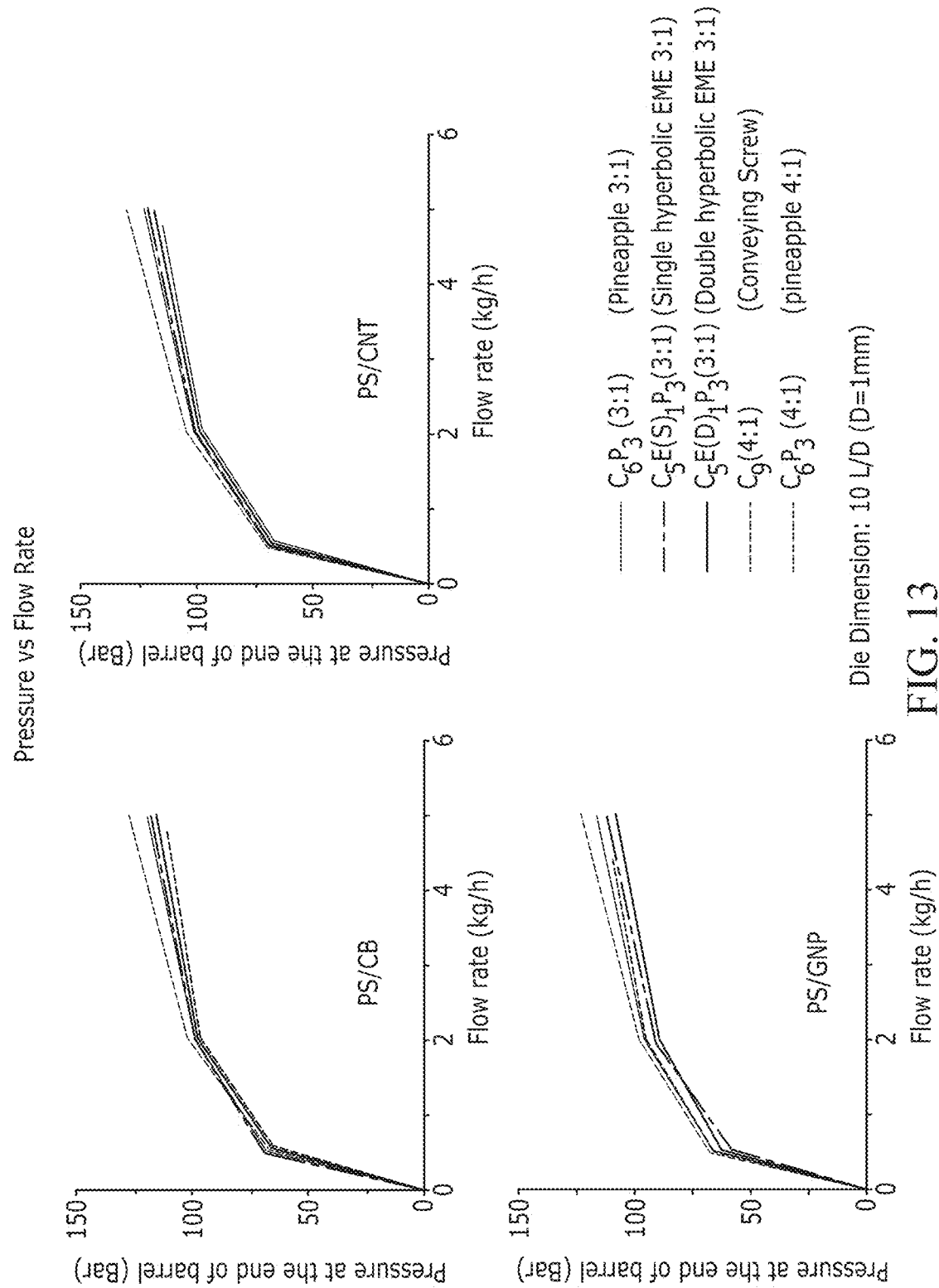
FIG. 13 shows graphs comparing pressure vs. flow rate of different mixing elements extruding different polymer materials.

Pressure and flow rates were compared for different combinations of mixing elements, namely, pineapple, single hyperbolic, double hyperbolic, and conveying screw. The polymer material extruded was a blend of polystyrene (PS) (98.5%) and different fillers (1.5%), namely, carbon black (CB), carbon nanotubes (CNT), and graphene nanoplatelets (GNP). In each case, the processing temperature was 230° C. The results are shown in FIG. 13.

Figure 14:
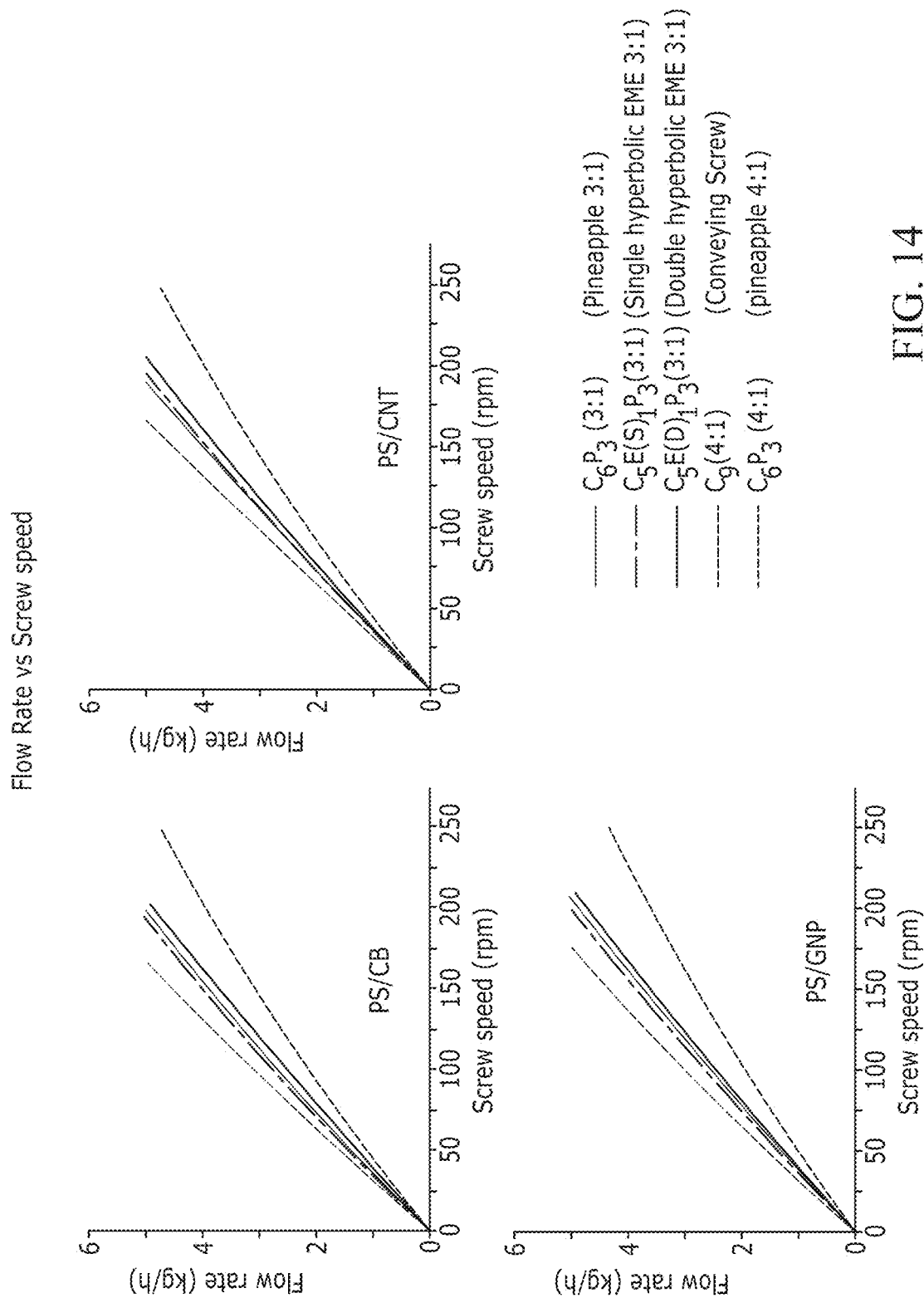
FIG. 14 shows graphs comparing flow rate vs. screw speed for the mixing elements and polymer materials of FIG. 13.

The flow rate vs. screw speed was evaluated with the same mixing elements for the same polymer blends. The results are shown in FIG. 14.

Figure 15:
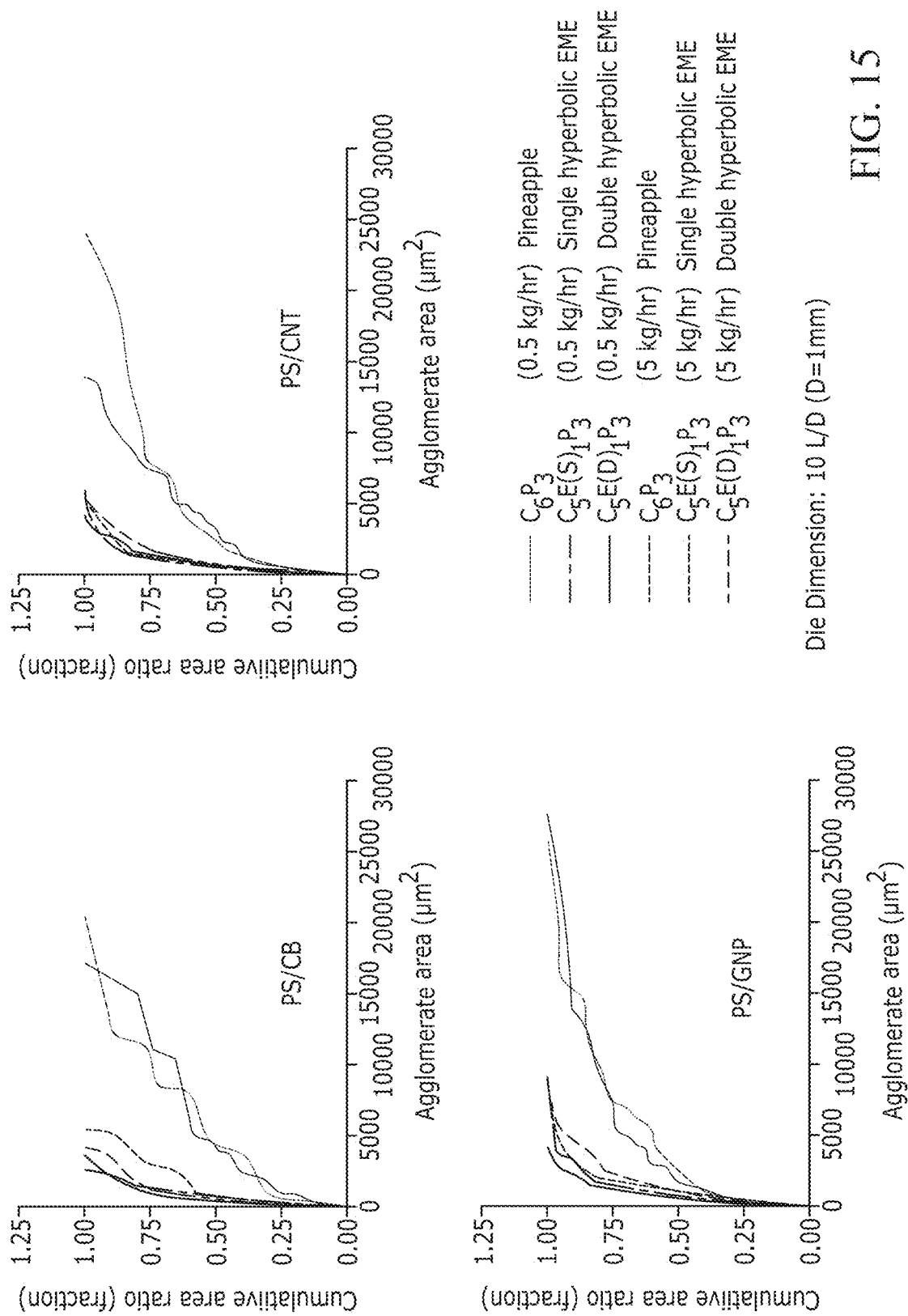
FIG. 15 shows graphs comparing cumulative area ratio vs. agglomerate area for the mixing elements and polymer materials of FIG. 13.

The cumulative area ratio and agglomerate area were also evaluated for the aforementioned mixing elements and polymer blends. The results are shown in FIG. 15. The cumulative area ratio measurements were based on the following equation:

$$F_{[i,j]}[\%] = \left( \sum_{i=j} A_{[i,j]} \bigg/ \sum_n A_n \right) \cdot 100 \qquad \text{Eq. 4}$$

It is clear from FIG. 15 that EME elements significantly broke the agglomerate compared to the pineapple elements.

Example 4

Figure 16:
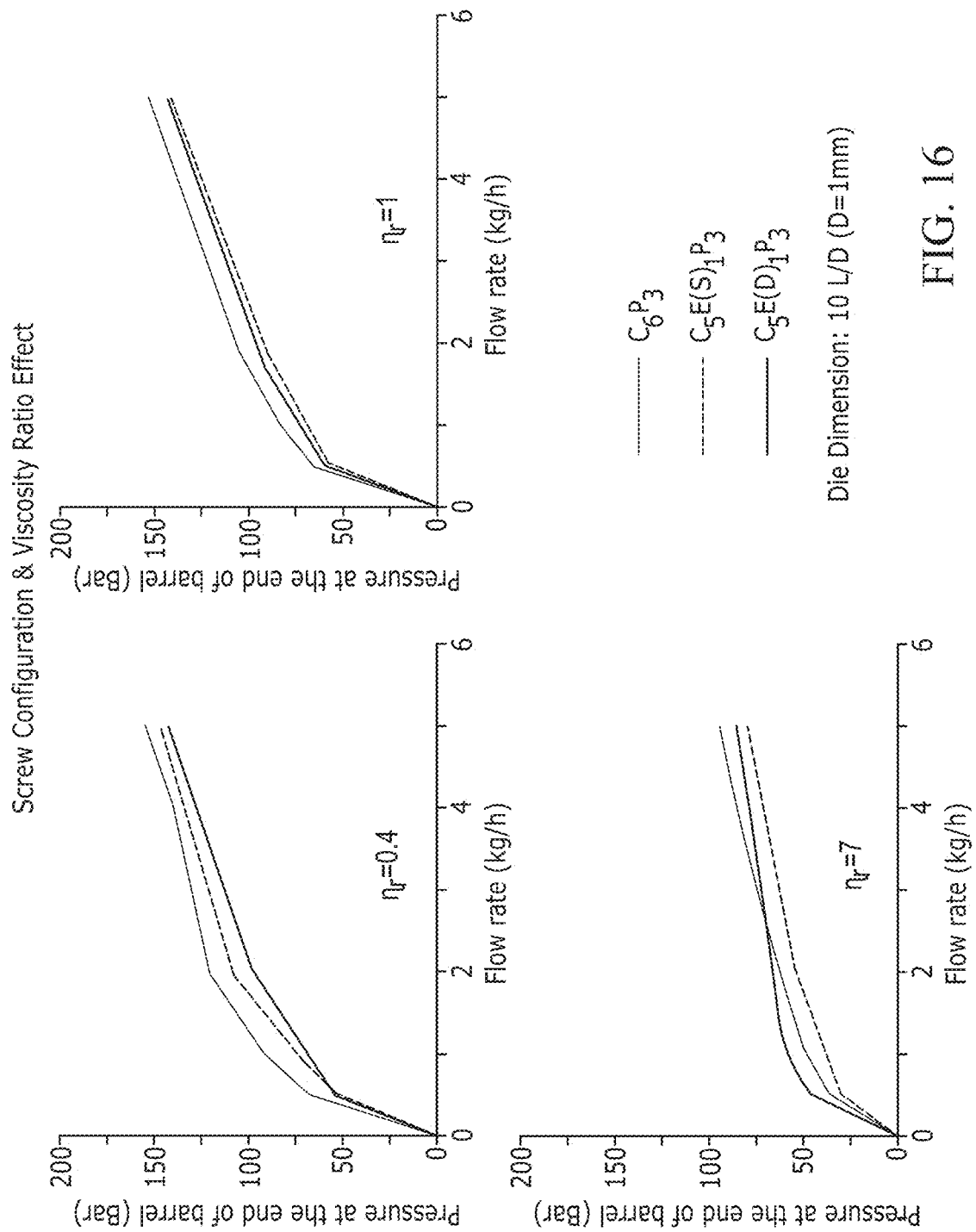
FIG. 16 shows graphs comparing pressure vs. flow rate of different mixing elements extruding different polymer materials.

Pressure and flow rates were compared for different combinations of mixing elements, e.g., pineapple, single hyperbolic, and double hyperbolic. The polymer material extruded was a PP/PS 80/20 blend having viscosity ratios ($\eta_r$) of 0.4, 1.0, and 7.0. In each case, the processing temperature was 230° C. The results are shown in FIG. 16.

Figure 17:
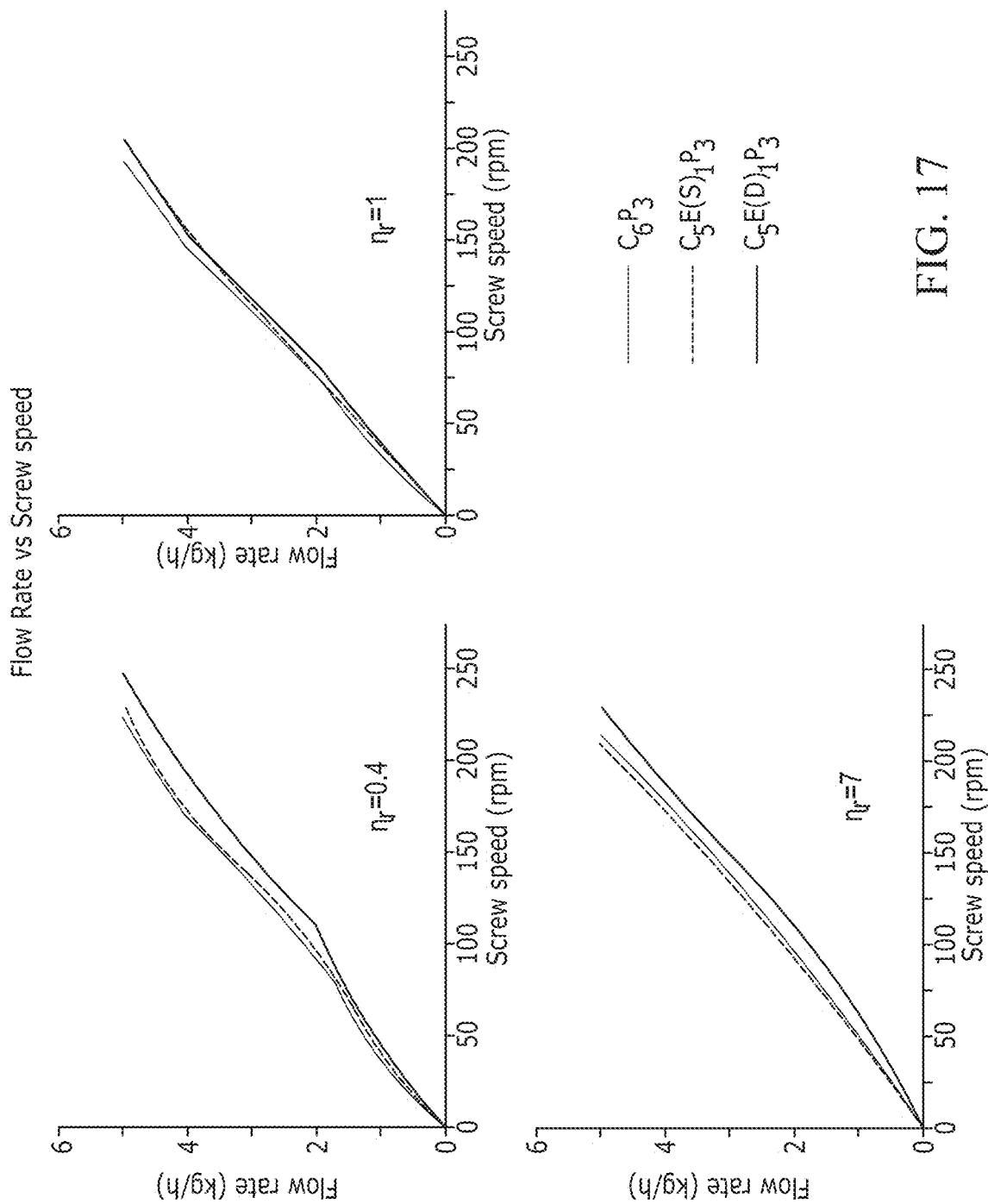
FIG. 17 shows graphs comparing flow rate vs. screw speed for the mixing elements and polymer materials of FIG. 16.

The flow rate vs. screw speed was evaluated with the same mixing elements for the same polymer blends. The results are shown in FIG. 17.

Figure 18:
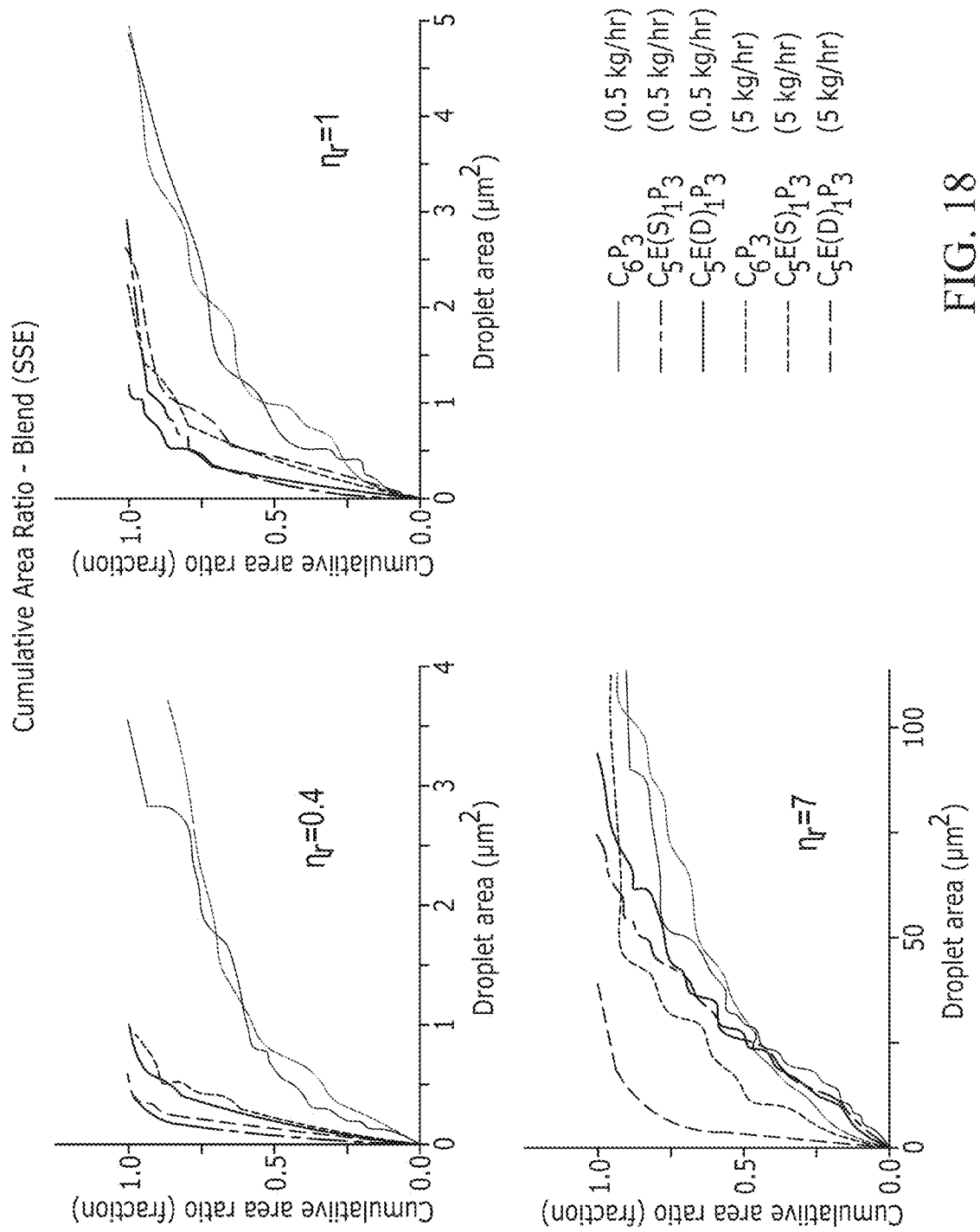
FIG. 18 shows graphs comparing cumulative area ratio vs. agglomerate area for the mixing elements and polymer materials of FIG. 16.

The cumulative area ratio and agglomerate area were also evaluated for the aforementioned mixing elements and polymer blends. The results are shown in FIG. 18. The cumulative area ratio measurements were based on Eq. 4.

The EME elements significantly broke the agglomerate compared to the pineapple elements. At lower viscosity ratios, there was no appreciable difference in performance between single and double hyperbolic EME. Double hyperbolic EME performed better than single hyperbolic EME for high viscosity ratios.

Results

ANSYS Polyflow simulations on EME channels considered inelastic Cross Model and evaluated both the mixing index ($\lambda$) and pressure profile. Incompressible and isothermal flow was assumed.

The efficacy of EMEs was tested experimentally for different systems: (a) immiscible polymer blends, i.e., fluid-fluid systems, (b) nanocomposites, i.e., fluid/solid systems and (c) thermoplastic elastomers. The resulting morphologies were compared and the results show a significant improvement in mixing with the EME elements of the present invention in all cases by comparison with even the most aggressive kneading-block configurations.

ANSYS Polyflow Simulation indicated that for SSE 1) an EME with four channels, 4:1 horizontal contraction, and no (1:1) vertical contraction as well as 2) an EME with four channels, 4:1 horizontal contraction, and 4:1 vertical contraction are desirable. The Simulation also indicated that for TSE 1) an EME with four channels, 4:1 horizontal contraction, and no (1:1) vertical contraction as well as 2) an EME with four channels, 4:1 horizontal contraction, and 2:1 vertical contraction are desirable.

The testing and simulations showed that adding EMEs to pineapple mixing screw does not necessarily change pressure build up. Adding EMEs significantly decreased the aggregate size for composite polymer materials. Double hyperbolic EMEs work better for higher viscosity ratios in polymer blends.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mixing element for a pair of extruder screws having a width extending in an x-direction of an x-y-z coordinate system, a length extending in a y-direction, and a depth extending in a z-direction, comprising:
   a pair of integrally formed bases each defining a passage extending along an axis in the y-direction for receiving one of the extruder screws, projections extending radially outward from each base and defining channels between adjacent projections and having a length in the y-direction bounded by an inlet and an outlet for polymer flow, the width and the depth of each channel varying along the length of the channel.

2. The mixing element of claim 1, the depth of each channel varying continuously along the length.

3. The mixing element of claim 2, each channel having a geometric center in the y-direction, the depth of each channel decreasing from the inlet to the geometric center and increasing from the geometric center to the outlet.

4. The mixing element of claim 1, the width of each channel varying continuously along the length.

5. The mixing element of claim 4, each channel having a geometric center in the y-direction, the width of each channel decreasing from the inlet to the geometric center and increasing from the geometric center to the outlet.

6. The mixing element of claim 1, the channels being double hyperbolic contracting-diverging channels.

7. The mixing element of claim 1, each base encircling the respective axis, the depth of each channel being determined between a radially outer surface of the projection and a surface of the base having a hyperbolic shape in the y-z plane.

8. The mixing element of claim 1, each channel having a contraction ratio in the z-direction of greater than about 1:1 to about 4:1.

9. The mixing element of claim 1, wherein the mixing element is a static mixing element and does not rotate with the pair of extruder screws.

\* \* \* \* \*